US008126286B2

(12) United States Patent  (10) Patent No.: US 8,126,286 B2
Imai  (45) Date of Patent: Feb. 28, 2012

(54) METHOD FOR CORRECTING DISTORTION OF IMAGE PROJECTED BY PROJECTOR, AND PROJECTOR

(75) Inventor: Shun Imai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 558 days.

(21) Appl. No.: 12/407,439

(22) Filed: Mar. 19, 2009

(65) Prior Publication Data

US 2009/0245682 A1  Oct. 1, 2009

(30) Foreign Application Priority Data

Mar. 27, 2008  (JP) .................................. 2008-083394

(51) Int. Cl.
*G06K 9/40*  (2006.01)
*H04N 5/64*  (2006.01)
(52) U.S. Cl. ........................................ 382/275; 348/744
(58) Field of Classification Search .................. 382/254, 382/274, 275, 305, 312; 348/744, 745, 746; 353/69, 72; 358/3.26, 3.27
See application file for complete search history.

(56) References Cited

U.S. PATENT DOCUMENTS

| | | | |
|---|---|---|---|
| 6,671,003 B1 * | 12/2003 | George et al. | 348/745 |
| 6,750,921 B1 * | 6/2004 | George | 348/745 |
| 7,084,888 B2 * | 8/2006 | Takahama et al. | 345/649 |
| 7,118,228 B2 * | 10/2006 | May | 353/99 |
| 7,226,173 B2 * | 6/2007 | Aoyanagi | 353/101 |
| 7,287,866 B2 * | 10/2007 | Yamamoto et al. | 353/119 |
| 7,384,157 B2 * | 6/2008 | Muraoka et al. | 353/69 |
| 7,411,737 B2 * | 8/2008 | Imaoka et al. | 359/649 |

FOREIGN PATENT DOCUMENTS

| | | |
|---|---|---|
| JP | A-11-146307 | 5/1999 |
| JP | A-2001-83949 | 3/2001 |

* cited by examiner

*Primary Examiner* — Kanjibhai Patel
(74) *Attorney, Agent, or Firm* — Oliff & Berridge, PLC (57) ABSTRACT

A method for correcting distortion of an image projected by a projector includes: a first detection image data producing step which produces first detection image data containing marker images; a first detection image displaying step which displays a first detection image; a first image comparing step which compares the first detection image with the first detection image data; an area selecting step which selects an area having larger distortion of the detection image than distortion in other area based on the comparison; a second detection image data producing step which increases positioning density of the marker images in the selected area to produce second detection image data; a second detection image displaying step which displays the second detection image; a second image comparing step which compares the second detection image with the second detection image data; and an image correcting step which corrects the projection image.

5 Claims, 9 Drawing Sheets

| MARKER | DISTORTION (X) | DISTORTION (Y) | RELATIVE DISTORTION (RIGHT) | RELATIVE DISTORTION (BELOW) |
|---|---|---|---|---|
| P1 | DX1 | DY1 | DY1+DYr | DX1+DXu |
| P2 | DX2 | DY2 | DY2+DYr | DX2+DXu |
| P3 | DX3 | DY3 | DY3+DYr | DX3+DXu |
| ... | ... | ... | ... | ... |
| Pn | DXn | DYn | DYn+DYr | DXn+DXu |

IMAGE PICKUP DATA          IMAGE CORRECTION DATA

METHOD FOR CORRECTING DISTORTION OF IMAGE PROJECTED BY PROJECTOR, AND PROJECTOR

BACKGROUND

1. Technical Field

The present invention relates to a method for correcting distortion of an image projected by a projector, and a projector.

2. Related Art

Currently, a projector which modulates light emitted from a light source according to inputted image signals to form projection images is known, and used for presentation and home theater.

Images projected by the projector are generally formed on a screen. This screen looks flat, but is not completely flat but actually has concaves and convexes. A certain portable winding-type screen or the like has large concaves and convexes. When images are projected on this type of screen, distortion is caused on the images in some cases.

For example, when the projector is disposed immediately below the screen for image projection, images are projected on the screen from below toward above. Thus, projection images are considerably distorted in the up-down direction.

For eliminating this distortion, JP-A-11-146307 discloses a technology for converting distorted images on a screen into appropriate images by correcting picture images displayed on a display panel.

Also, JP-A-2001-83949 discloses a technology for capturing images of projection images formed on a screen having freely curved surface by using a camera disposed at a viewpoint, producing correction data for giving opposite distortion beforehand, and correcting picture images desired to be projected based on the correction data.

According to the technology shown in JP-A-11-146307, distortion of relative positions between the screen and the projector can be corrected. However, distortion produced on the screen due to the concaves and convexes of the screen cannot be corrected.

According to the technology shown in JP-A-2001-83949, in case of images having partial large distortion, correction patterns for obtaining detailed information about the entire areas of the images are required for correcting images with high accuracy. In this case, processing load increases.

SUMMARY

It is an advantage of some aspects of the invention to provide a method for correcting distortion of an image projected by a projector, capable of correcting distortion of a projection image highly accurately without increasing processing load, and to provide a projector.

According to a first aspect of the invention, there is provided a method for correcting distortion of an image projected by a projector including: a first detection image data producing step which produces first detection image data containing marker images whose flat surface positions in the projection image can be calculated; a first detection image displaying step which displays a first detection image based on the first detection image data; a first image comparing step which compares the first detection image with the first detection image data; an area selecting step which selects an area having larger distortion of the first detection image than distortion in other area based on the comparison; a second detection image data producing step which increases positioning density of the marker images in the selected area to produce second detection image data; a second detection image displaying step which displays a second detection image based on the second detection image data; a second image comparing step which compares the second detection image with the second detection image data; and an image correcting step which corrects the projection image.

The detection image data may be various types of data which contains marker images whose positions on a flat surface in the projection image can be calculated. For example, image data containing a plurality of marker images discretely disposed on a flat surface, image data containing grating pattern on the entire image, and image data containing checkered pattern on the entire image may be employed.

The image correcting step may be any step as long as it can finally correct distortion of the projection image. The image correction may control concaves and convexes on the screen to correct the distortion of the projection image, or correct image signals inputted to the projector.

According to this aspect of the invention, the area having large distortion of the detection image is selected by the area selecting step, and the positioning density of the marker images in the selected area is increased by the detection image data correcting step to obtain more detailed information about the condition of the distortion. Thus, the condition of the concaves and convexes of the screen is recognized with high accuracy, and the degree of correction is easily calculated by recognizing the distortion with high accuracy. Accordingly, correction can be performed by the image correcting step without increasing processing load.

It is preferable that the first detection image data is image data containing a plurality of marker images discretely arranged on a flat surface. In this case, the first image comparing step captures an image of the first detection image using an image capturing unit, and calculates distortion between the first detection image data and captured data of the first detection image using statistical method. The second image comparing step captures an image of the second detection image using the image capturing unit, and calculates distortion between the second detection image data and captured data of the second detection image using statistical method. The area selecting step selects an area having distortion equal to or larger than a predetermined threshold.

The statistical method may be various types of analysis method such as main component analysis, regression analysis, and multiple regression analysis.

In this case, it is preferable that the image correcting step corrects an inputted image signal.

According to this structure, an image of the detection image is captured by the image capturing unit, and the detection image data is automatically corrected by an information processing device such as computer or an image processing unit included in the projector. Thus, distortion on the projection image caused by concaves and convexes of the screen can be automatically detected without requiring operation by the observer or the like.

Since the inputted image signal is corrected by the image correcting step, the correction process is performed within the information processing device or the image processing unit included in the projector. Thus, a series of processes containing those from detection to correction can be automatically executed.

It is preferable that the statistical method employed in the first image comparing step and the second image comparing step is least squares method.

According to this structure, distortion is calculated using least squares method generally used in wide application fields. Thus, processing load given to the information processing device or the image processing unit of the projector can be further reduced.

It is preferable that a relative distortion calculating step which calculates relative distortion between adjoining marker images is performed between the first image comparing step and the area selecting step, and that the area selecting step also selects an area having relative distortion calculated by the relative distortion calculating step equal to or larger than the predetermined threshold.

According to this structure, an area having small distortion with respect to the detection image data but large distortion with respect to an adjoining marker image in the distortion produced in the detection image can be detected. Thus, the accuracy of the distortion correction of the projection image can be further increased.

The invention is applicable to a projector, and operations and advantages similar to those in the distortion correction method described above are provided by the projector.

According to a second aspect of the invention, there is provided a projector which forms a projection image including: a first detection image data producing unit which produces first detection image data containing marker images whose flat surface positions in the projection image can be calculated; a second detection image data producing unit which increases positioning density of the marker images in selected area to produce second detection image data; a detection image displaying unit which displays a first detection image based on the first detection image data, and displays a second detection image based on the second detection image data; an image capturing unit which captures an image of the first detection image displayed, and captures an image of the second detection image displayed; an image comparing unit which calculates first distortion between captured data of the first detection image captured by the image capturing unit and the first detection image data, and calculates second distortion between captured data of the second detection image captured by the image capturing unit and the second detection image data; an area selecting unit which selects an area having the calculated distortion equal to or larger than the predetermined threshold; and an image signal correcting unit which corrects the inputted image signal based on the correction result of the second detection image data correcting unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are hereinafter described with reference to the drawings.

First Embodiment

Figure 1:
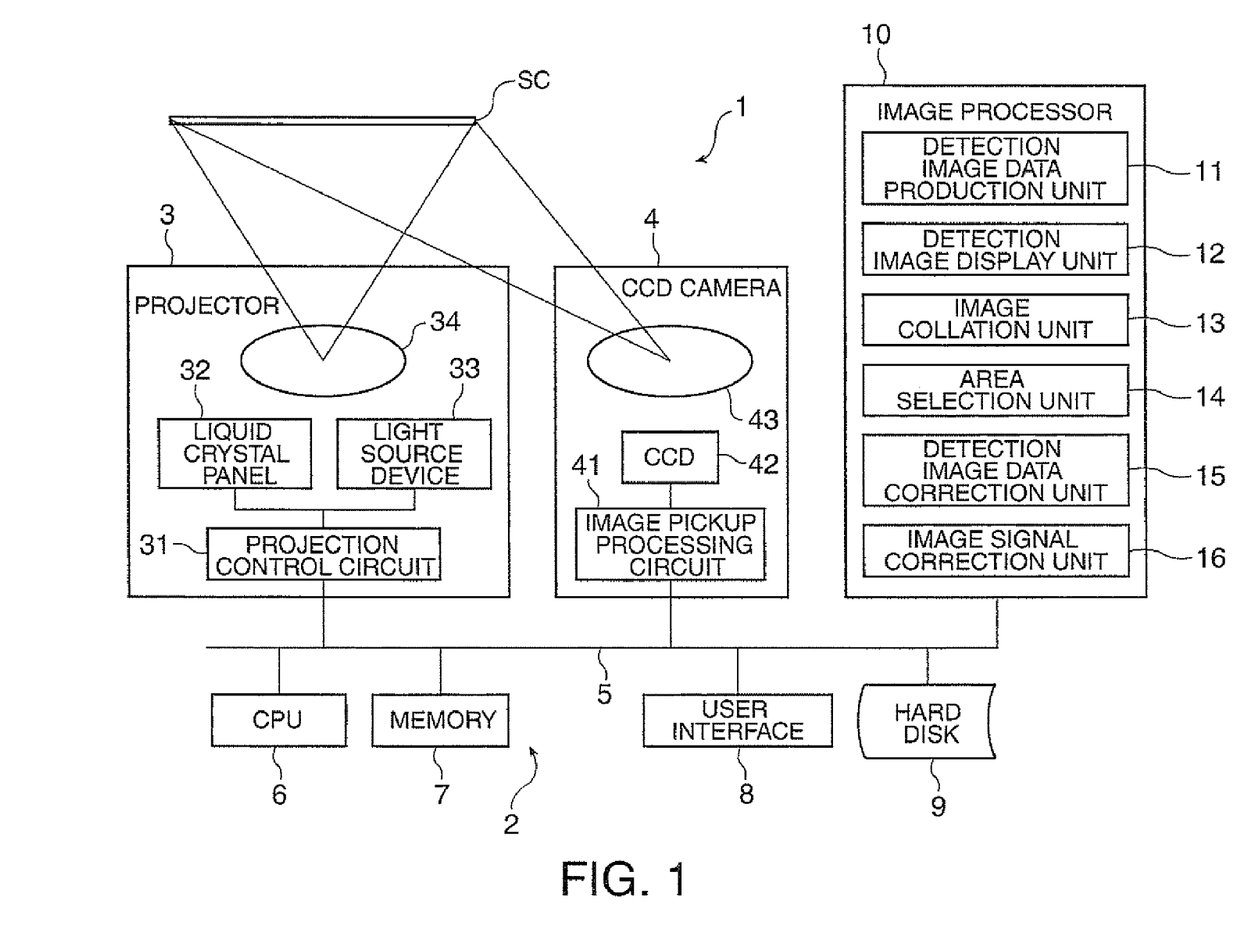
FIG. 1 is a block diagram showing a structure of a projection system according to a first embodiment of the invention.

FIG. 1 illustrates a projection system 1 which executes a method for correcting distortion of images projected by a projector according to a first embodiment of the invention. The projection system 1 includes a computer 2, a projector 3 connected with an input/output port of the computer 2 such as USB via a cable or the like, and a CCD camera 4.

The computer 2 is basically constituted by a general-purpose computer, including a CPU (central processing unit) 6, a memory 7, a user interface 8 such as keyboard and mouse, and a hard disk 9 capable of communicating with one another via a bus 5. An image processor 10 is connected with the bus 5 such that the image processor 10 can communicate via the bus 5.

The projector 3 is an optical device which modulates image information outputted from the computer 2 according to respective images to form optical images, and projects the optical images on a screen SC. The projector 3 includes a projection control circuit 31, a liquid crystal panel 32, a light source device 33, and a projection lens 34.

The projection control circuit 31 is roughly divided into a block for processing inputted image information, a block for controlling overall inputs and outputs of the projector 3, a block for controlling drive of the liquid crystal panel 32, and a block for controlling drive of the light source device 33.

The liquid crystal panel 32 has an image forming area containing a plurality of pixels disposed in matrix to produce gradation display using respective pixels according to the inputted image information.

The liquid crystal panel 32 has a structure produced by sealing liquid crystals between a pair of transparent substrates for driving the liquid crystals by TFTs (thin film transistors) provided on one of the substrates. Not-shown entrance side polarization plate and exit side polarization plate are disposed on the light entrance side and light exit side of the liquid crystal panel 32, respectively. The liquid crystal panel 32 controls orientation of the liquid crystals by the function of the TFTs as switching elements, and produces gradation display corresponding to the image information by controlling the quantity of light released from the exit side polarization plate. Though not shown in FIG. 1, the liquid crystal panel 32 has three panels each of which modulates corresponding color light of red, blue, and green lights.

The light source device 33 has a light source lamp constituted by a discharge arc tube and a reflector. An integrator lens as equalizing illumination system, and a dichroic mirror as color separating system are disposed on the optical path of light emitted from the light source device 33. In this structure, the in-plate illuminance of the light emitted from the light source device 33 is equalized, and the equalized light enters the corresponding panels of the liquid crystal panel 32 after separation into red light, green light, and blue light.

The CCD camera 4 as image capturing unit captures projection images projected on the screen SC from the projector 3, and outputs image data of the obtained images to the image processor 10 of the computer 2. The CCD camera 4 has an image capturing processing circuit 41, a CCD (charge coupled device) 42, and an image capturing lens 43 to capture images in response to control commands issued from the computer 2.

The image capturing processing circuit 41 as a section for processing images obtained by the CCD 42 converts the captured data after photoelectric conversion process by the CCD 42 into image data having preferable color reproducibility by performing correcting process such as gamma correcting process and other correcting process for color unevenness, luminance unevenness, and other conditions based on LUT.

The CCD 42 is a section which detects light quantity of optical images received via the image capturing lens 43 and performs photoelectric conversion to produce image signals. The CCD 42 contains a plurality of detection pixels arranged flat.

The image processor 10 has a detection image data production unit 11 as a program operating on a calculating device, a detection image display unit 12, an image comparing unit 13, an area selection unit 14, a detection image data correction unit 15, and an image signal correction unit 16.

The detection image data production unit 11 is a section which produces detection image data used for correcting distortion of projection images of the projector 3 caused by the distortion of the screen SC.

Figure 2:
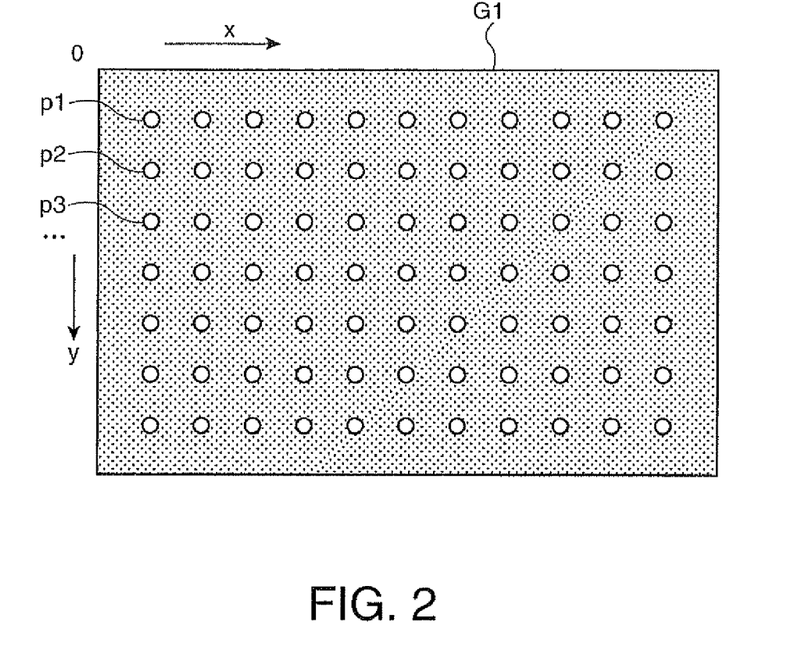
FIG. 2 schematically illustrates a structure of detection image data according to the first embodiment.

The detection image data production unit 11 produces detection image data G1 shown in FIG. 2, for example. In this embodiment, the detection image data G1 has a structure containing marker images p1, p2, p3, and others discretely arranged on a black image, and sets coordinates p1 (x1, y1), p2 (x2, y2), p3 (x3, y3), and others as the positions of the marker images p1, p2, p3, and others with the origin O put at the left upper end of the detection image data G1.

The detection image display unit 12 is a section for displaying the detection image data G1 produced by the detection image data production unit 11 as a projection image of the projector 3. The detection image display unit 12 outputs the detection image data G1 to the projector 3, and the projector 3 displays the detection image data G1 as a projection image. An image of the projection image projected by the projector 3 is captured by the CCD camera 4 discussed above, and given to the image processor 10 as captured data.

The image comparing unit 13 is a section for comparing the captured data with the detection image data G1 to calculate distortion of the projection image. The image comparing unit 13 which initially needs to obtain the coordinates of the captured data performs the process shown in the flowchart in FIG. 3.

Figure 3:
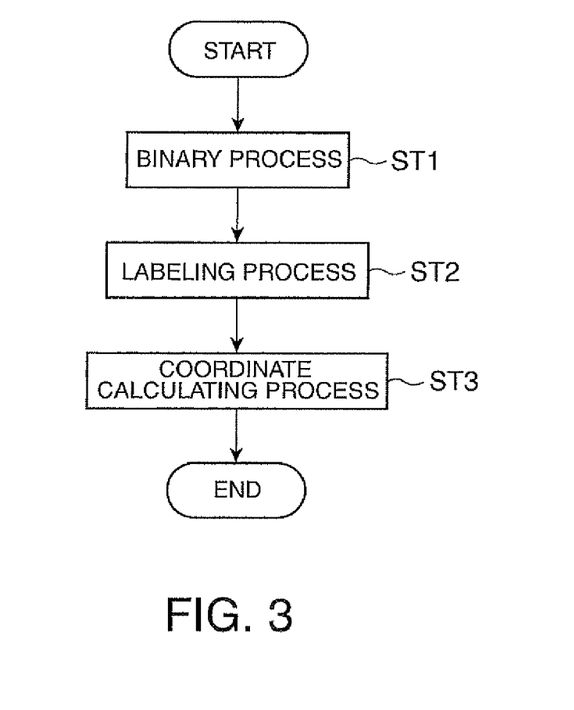
FIG. 3 is a flowchart showing processes for setting coordinate positions performed by an image comparing unit in the first embodiment.

Initially, the image comparing unit 13 obtains pixels having the maximum luminance and the minimum luminance in the captured data, and sets the intermediate luminance of the maximum and minimum as threshold to provide binary values for all the pixels in the captured data based on the threshold (process ST1).

Then, the image comparing unit 13 obtains areas where the maximum luminance continues in the binary image, and labels each of the areas (process ST2).

Finally, the image comparing unit 13 determines the maximum luminance as coordinates of the area for each of the areas of the captured data sectioned by the labeling process (process ST3). In setting the coordinates, the geometrical center position or the center of gravity may be used as coordinates based on the contours of the respective areas labeled using the binary image.

Figure 4:
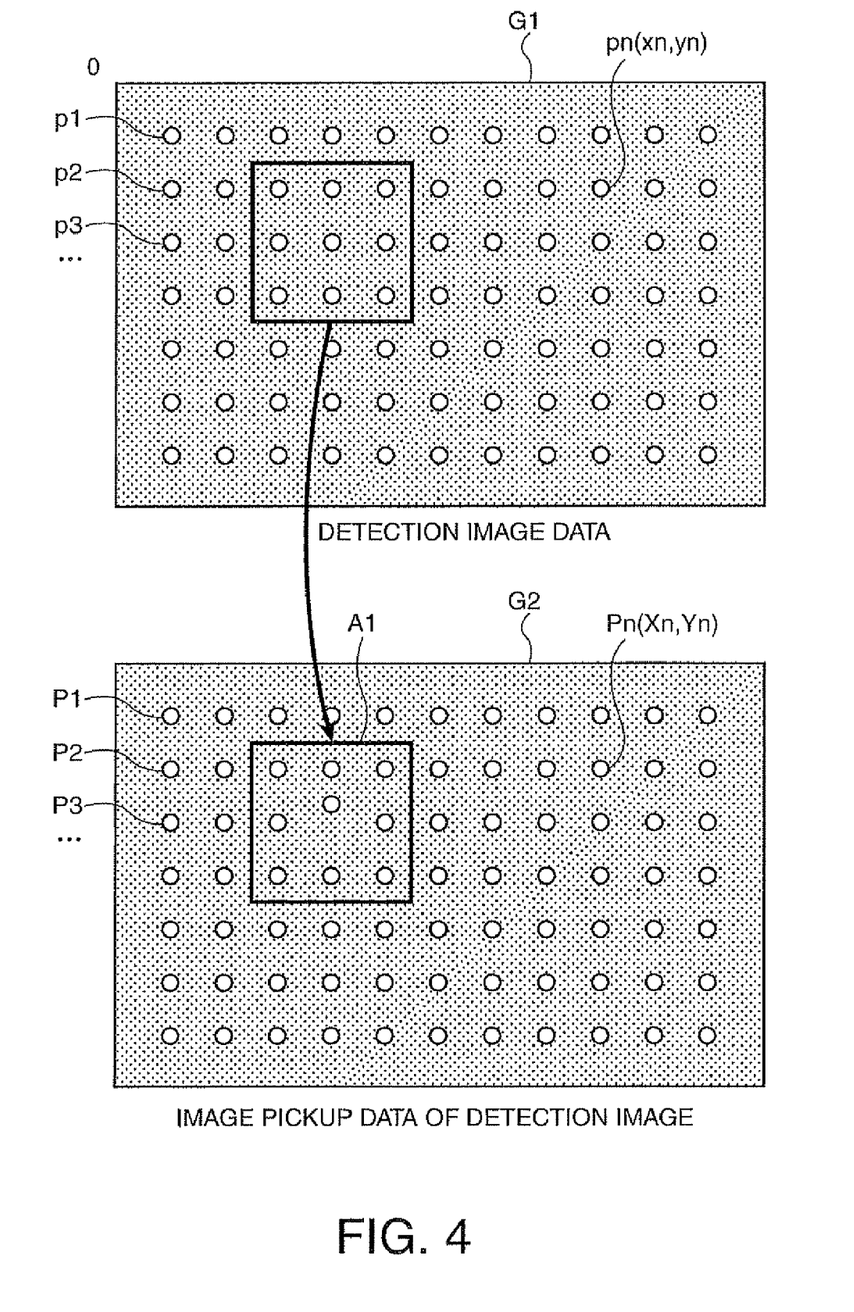
FIG. 4 schematically illustrates a method for calculating distortion by the image comparing unit in the first embodiment.

After the coordinate positions of the marker images in the captured data are established, the image comparing unit 13 compares the marker images of the captured data with those of the detection image data G1 using projective transformation. According to an example shown in FIG. 4, a point pn of the detection image data G1 has coordinates (xn, yn), and a point Pn in the captured data corresponding to the point pn has coordinates Pn (Xn, Yn). When projective transformation is completely performed on the screen SC having no concave and convex, the correspondence between the points pn and Pn is expressed in the following equation (1) using projective transformation matrix A.

$$\begin{bmatrix} Xn \\ Yn \end{bmatrix} = \begin{bmatrix} a_{11} & a_{21} \\ a_{12} & a_{22} \end{bmatrix} \cdot \begin{bmatrix} xn \\ yn \end{bmatrix} \quad (1)$$

$$A(\text{projective transformation matrix}) = \begin{bmatrix} a_{11} & a_{21} \\ a_{12} & a_{22} \end{bmatrix}$$

When the screen SC has concaves and convexes or the like, a part of the positions of the marker images are shifted to distort the image as indicated by an area A1 shown in FIG. 4.

In this case, the image comparing unit 13 calculates difference between the coordinates of the respective marker images in the captured data and projective transformation coordinates P'n (X'n, Y'n) obtained using the above equation (1) to calculate distortion DXn (horizontal direction) and DYn (vertical direction). More specifically, the image comparing unit 13 calculates the relationship between the projective transformation coordinates and the coordinates of the captured data using least squares method.

Figure 5:
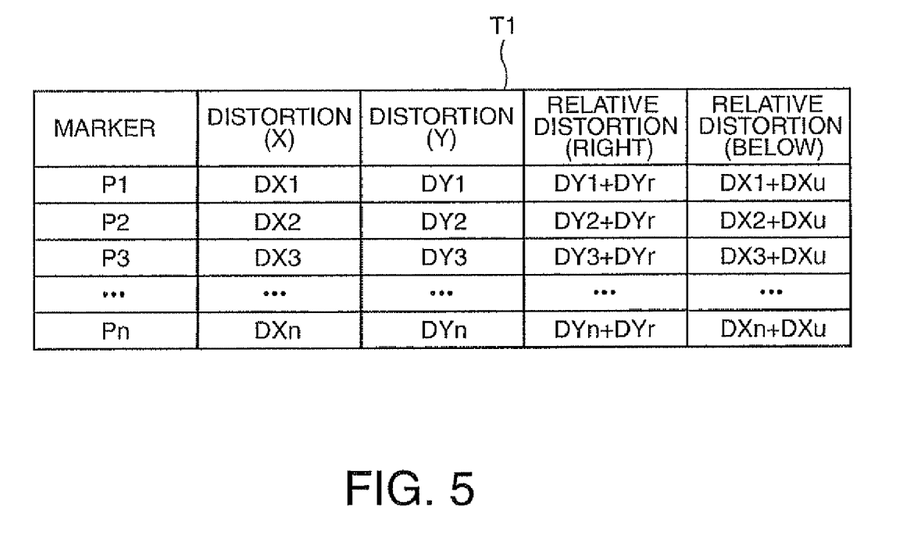
FIG. 5 schematically illustrates a data structure in a memory storing distortion calculated by the image comparing unit in the first embodiment.

When all the distortions DXn, DYn between the captured data of the marker images P1, P2, P3, and others and the projective transformation coordinates are calculated, the image comparing unit 13 stores the distortions DXnr DYn of the respective marker images P1, P2, P3, until Pn in a table T1 shown in FIG. 5 in the memory area of the memory 7.

Then, the image comparing unit 13 produces relative distortion as the sum of the distortion DYn of the received DXn, DYn and distortion DYr of the adjoining marker image on the right side of the DYn for each of the marker images P1, P2, P3, until Pn, and produces relative distortion as the sum of the distortion DXn and distortion Dxu of the adjoining marker image positioned below to store the relative distortion in the table T1.

Figure 6:
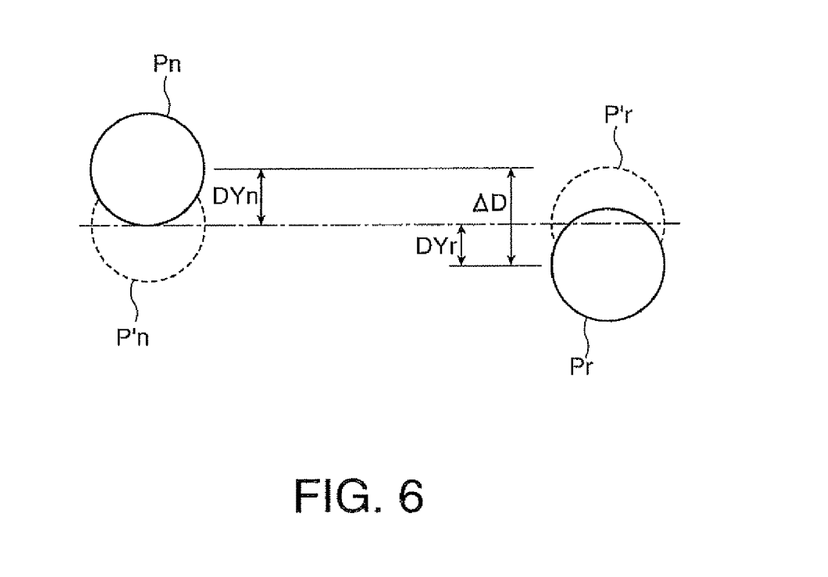
FIG. 6 schematically illustrates relative distortion in the first embodiment.

The distortion DYr of the adjoining marker image positioned on the right side and the distortion DXu of the adjoining marker image positioned below are added to correct large distortion ΔD produced between the relative positions of the marker image Pn and the adjoining marker image Pr due to waves of the screen SC or the like even when the distortion between the marker image Pn and the marker image P'n after projective transformation is small as illustrated in FIG. 6.

The area selection unit 14 is a section for selecting parts having larger distortion in the captured data based on the distortion DXn, DYn and the relative distortion DYn+DYr, DXn+DXu calculated by the image comparing unit 13.

According to the selection method of the area selection unit 14, a screen requiring selection by an operator of the computer 2 is displayed for the operator.

Figure 7:
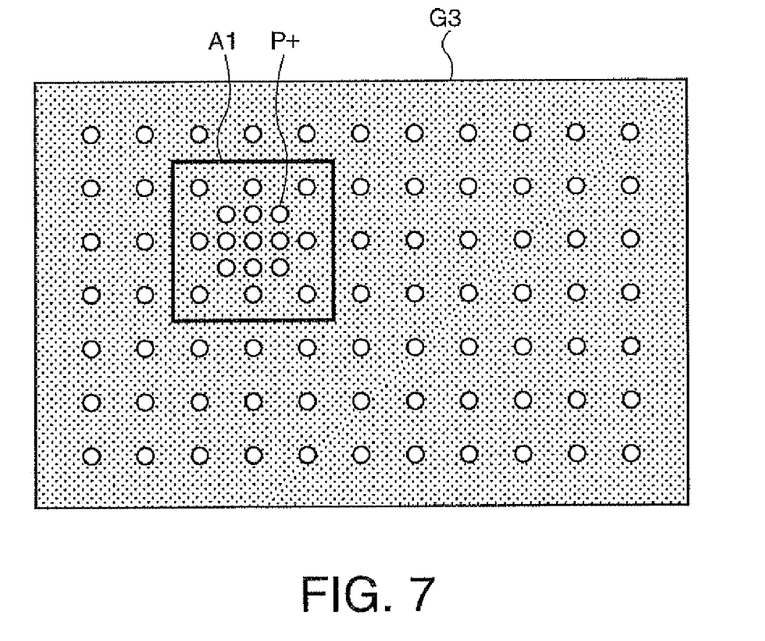
FIG. 7 schematically illustrates condition where positioning density of marker images is increased by a detection image data correction unit in the first embodiment.

The detection image data correction unit 15 adds marker images P+ in the area A1 selected by the area selection unit 14 to increase the positioning density of the marker images for correction as a detection image data G3 shown in FIG. 7. In this embodiment, the density of the marker images P+ in the selected area A1 is doubled, but the density may be higher or arbitrarily set by the operator of the computer 2.

Figure 8:
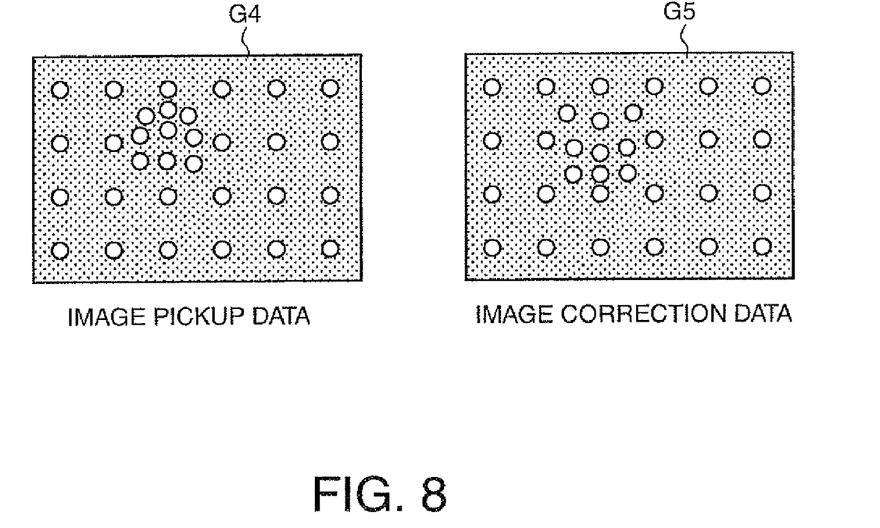
FIG. 8 schematically illustrates a correction method for an image signal using an image signal correction unit in the first embodiment.

The image signal correction unit 16 is a section for correcting the inputted image signal based on the distortion DXn, DYn and the relative distortion DYn+DYr and DXn+DXu stored in the table T1 retained in the memory 7. More specifically, when distortion obtained from the captured data is in the condition of image data G4, the image signal is corrected using data containing reversely deformed distortion as in image correction data G5 illustrated in FIG. 8. The specific correction can be easily calculated from the distortion DXn, DYn and the relative distortion DYn+DYr and DXn+DXu stored in the table T1 retained in the memory.

Figure 9:
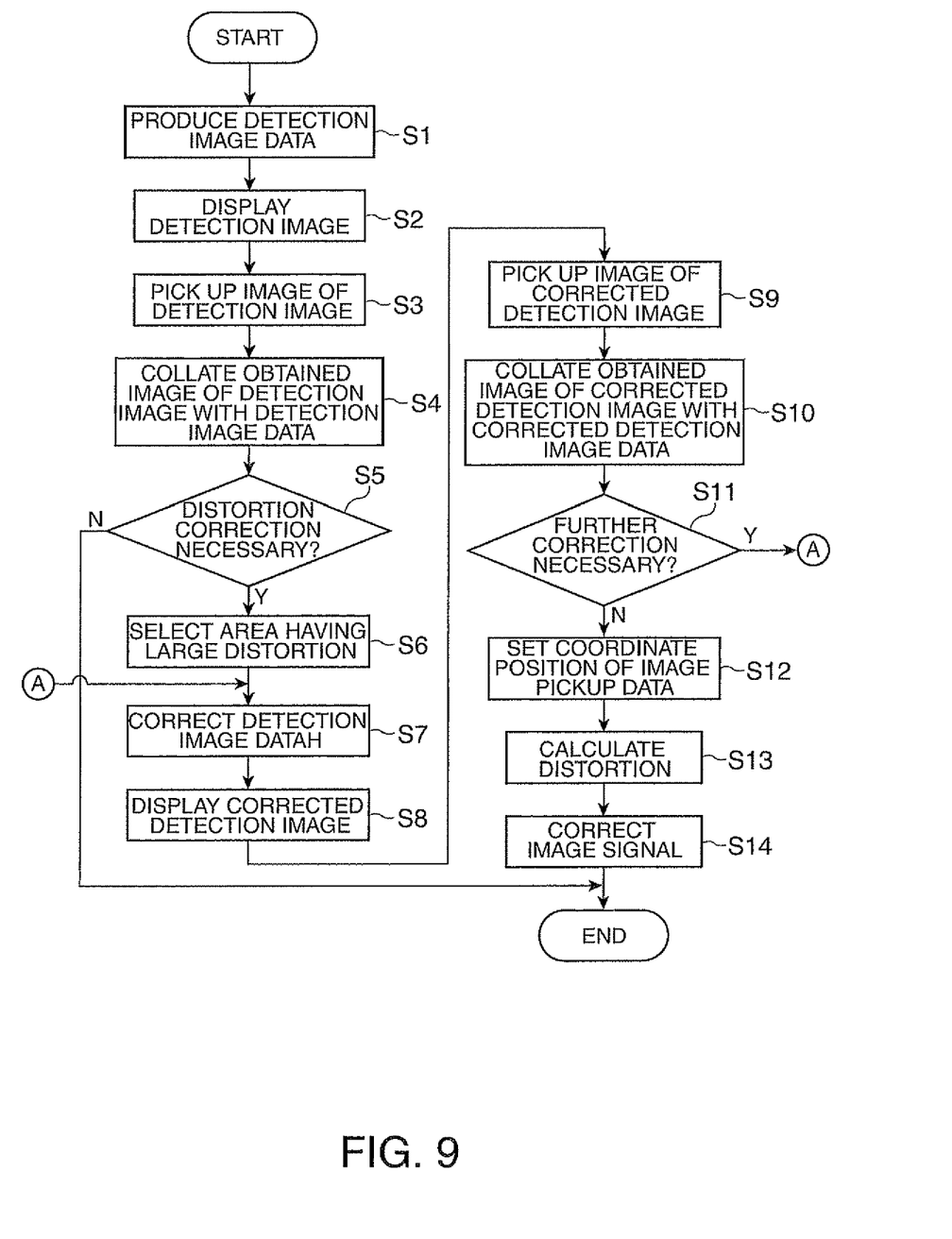
FIG. 9 is a flowchart showing a method for correcting distortion of an image projected by a projector in the first embodiment.

The method for correcting distortion of images projected by the projector according to this embodiment is now described with reference to a flowchart shown in FIG. 9.

Initially, the detection image data production unit 11 produces the detection image data G1 and outputs the detection image data G1 to the projector 3 (step S1).

The projector 3 displays a detection image on the screen SC based on the inputted detection image data G1 (step S2).

The CCD camera 4 captures an image of the detection image projected on the screen SC in response to a control command issued from the computer 2, and outputs the captured data G2 to the image processor 10 (step S3).

The image comparing unit 13 displays the detection image data G1 and the captured data G2 on the display of the computer 2, and requires the operator to compare the detection image data G1 with the captured data G2 (step S4).

The operator judges whether the distortion correction is necessary or not by observing the image data G1 and G2 on the display (step S5), and ends the process when the distortion correction is judged unnecessary.

When the operator judges that the distortion correction is necessary, the operator selects an area having large distortion (step S6).

When the operator determines the area containing large distortion, the detection image data correction unit 15 corrects the detection image data G3 by adding the marker images P+ as illustrated in FIG. 7.

The detection image display unit 12 projects and displays the corrected detection image on the screen SC (step S8).

The CCD camera 4 captures an image of the corrected detection image projected on the screen SC, and outputs the captures data G2 to the image processor 10 according to the control command from the computer 2 (step S9). In this case, the range of the corrected detection image data G3 captured by the CCD camera 4 lies only on the selected area A1, and distortion of only the corresponding area is calculated by the image comparing unit 13.

The image comparing unit 13 displays the corrected detection image data G3 and the image pickup data corresponding to the corrected detection image on the display of the computer 2, and requires the operator to compare these image data (step S10).

When the operator determines that further correction is necessary based on the result of the comparison of these image data (step S11), the process returns to step S7 to repeat steps from correction of the detection image data.

When the operator determines that correction is unnecessary, the image comparing unit 13 sets coordinate positions of the marker images P1, P2, P3 until Pn based on the captured data G2 (step S12).

Subsequently, the image comparing unit 13 calculates distortions DX1, DX2, DX3 until DXn, and DY1, DY2, DY3 until DYn for the marker images P1, P2, P3 until Pn, and also calculates the relative distortions DY1+DYr, DY2+DYr, DY3+DYr until DYn+DYr, and DX1+DXu, DX2+DXu, DX3+DXu until DXn+DXu (step S13) to store these distortions in the table T1 of the memory 7.

The image signal correction unit 16 corrects the image signal based on the distortions DX1, DX2, DX3 until DXn, and DY1, DY2, DY3 until DYn, and the relative distortions DY1+DYr, DY2+DYr, DY3+DYr until DYn+DYr, and DX1+DXu, DX2+DXu, DX3+DXu until DXn+DXu stored in the memory 7 (step S14), and ends the process.

According to this embodiment, the area having large distortion is selected by comparison between the image data G2 corresponding to the image obtained from the detection image displayed on the screen SC and the detection image data G1 for correction of the detection image data. By this method, more detailed information about the condition of the distortion is obtained by increasing the density of the marker images P+, and thus the condition of the concaves and convexes of the screen SC is recognized with high accuracy. Accordingly, image signal can be corrected highly accurately, and the processing load can be decreased to the minimum.

Moreover, the distortions DX1, DX2, DX3 until DXn, and DY1, DY2, DY3 until DYn are calculated using least squares method. Thus, the processing load given to the computer 2 can be reduced.

Furthermore, the relative distortions DY1+DYr, DY2+DYr, DY3+DYr until DYn+DYr, and DX1+DXu, DX2+DXu, DX3+DXu until DXn+DXu as well as the distortions DX1, DX2, DX3 until DXn, and DY1, DY2, DY3 until DYn are calculated. Since not only the large distortions in the detection image data G1 but also the relative distortions relatively large with respect to the adjoining marker images are calculated, distortion correction of the projection image can be achieved with further accuracy.

Second Embodiment

A second embodiment according to the invention is now described. Similar reference numbers are given to parts similar to those in the above embodiment, and the same explanation is not repeated.

According to the first embodiment described above, the image processor 10 which performs the distortion correction method for images projected by the projector of the invention is included in the computer 2 connected with the projector 3, and outputs the detection image data G1 and the corrected detection image data G3 from the computer 2 to the projector.

Figure 10:
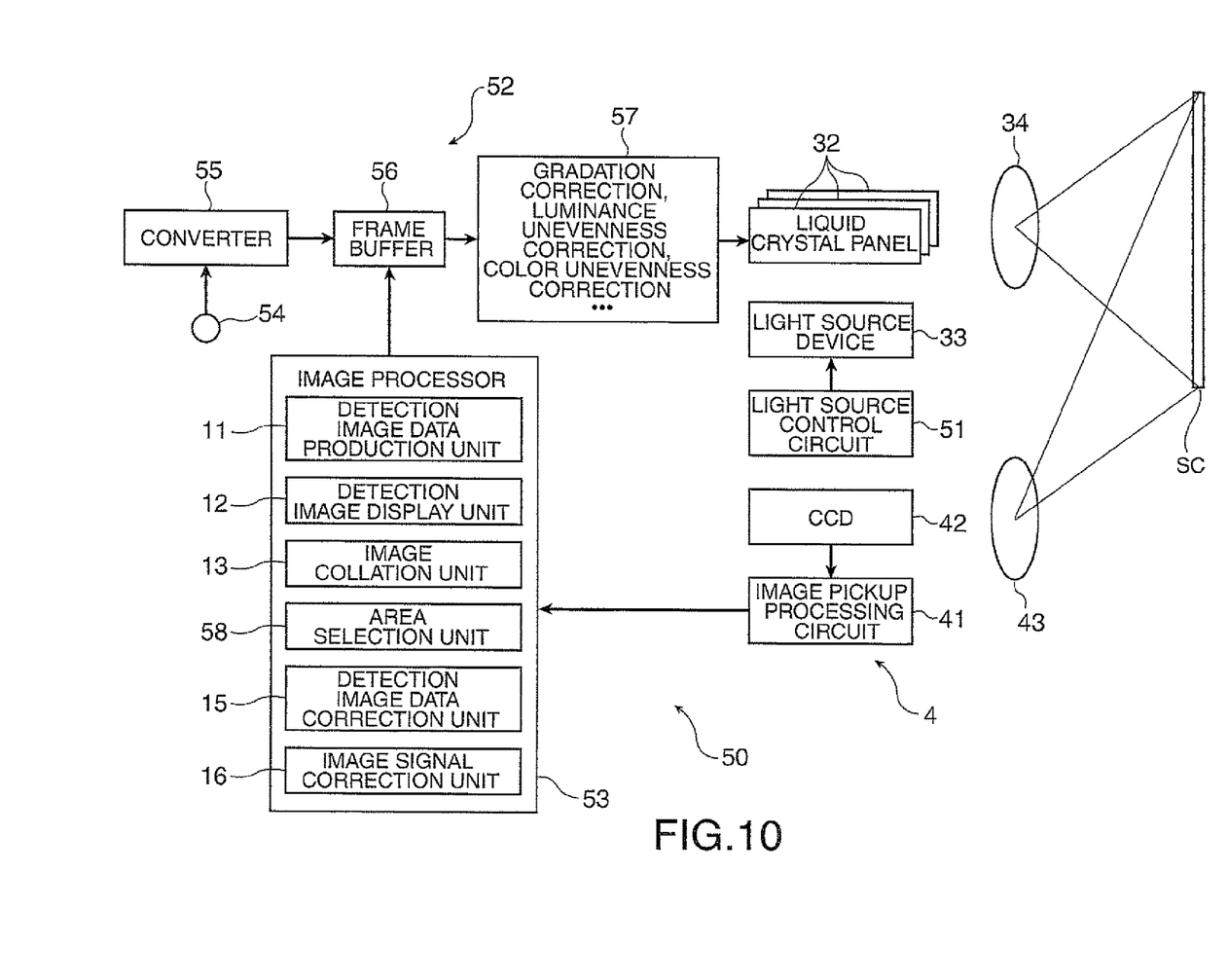
FIG. 10 is a block diagram showing a structure of a projector according to a second embodiment of the invention.

However, the distortion correction method for images projected by the projector in the second embodiment is different from the distortion correction method in the first embodiment in that an image processor 53 and the CCD camera 4 are included in a projector 50 to perform shape distortion assist method for projection images within the projector 50 as illustrated in FIG. 10.

According to the first embodiment described above, the area to which the marker images P+ are added is selected by displaying the screen which requires the operator of the computer 2 to select by the function of the area selection unit 14 such that the operator can select appropriate area.

Figure 11:
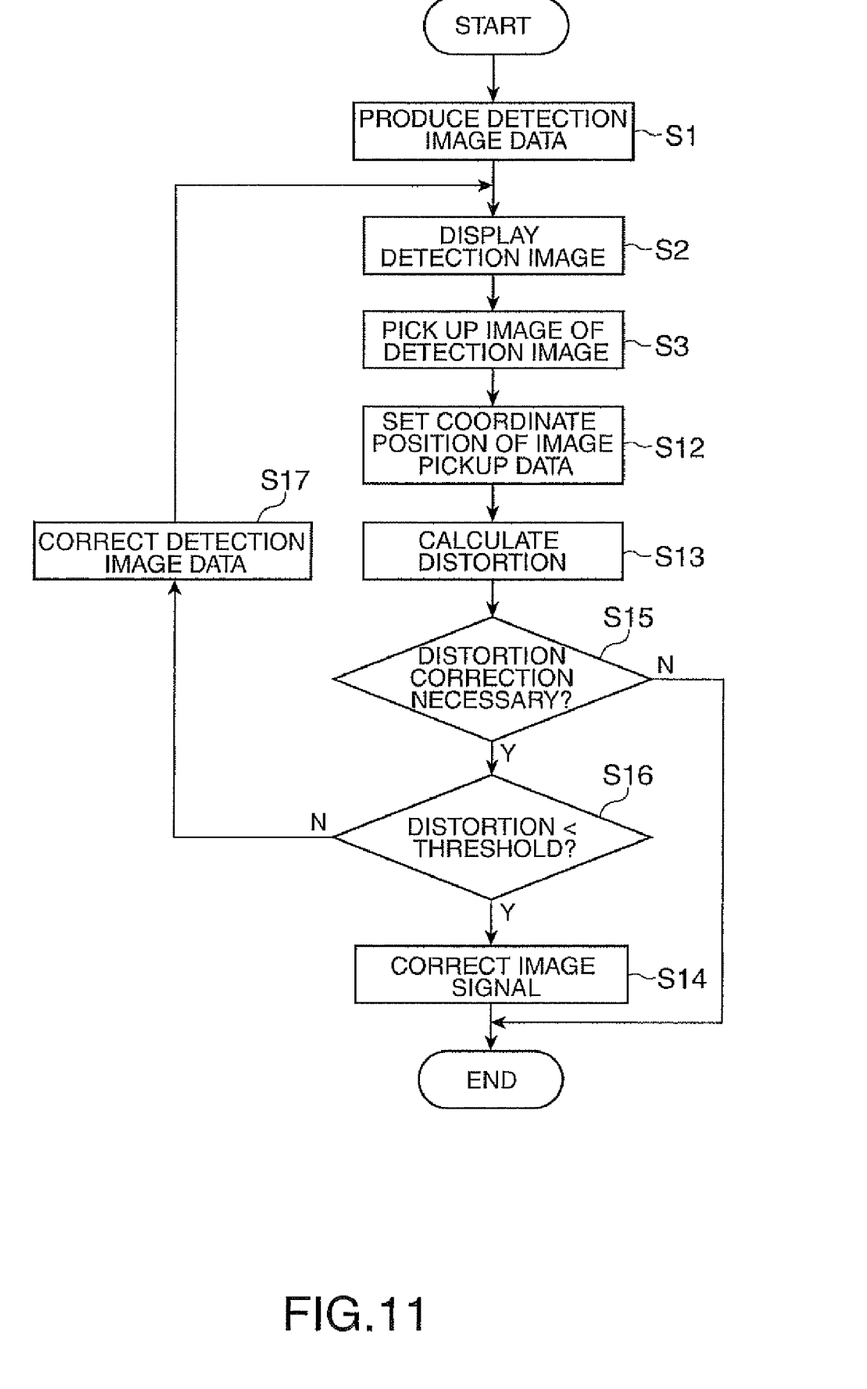
FIG. 11 is a flowchart showing a method for correcting distortion of an image projected by the projector in the second embodiment.

However, the distortion correction method for images projected by the projector in the second embodiment is different from the distortion correction method in the first embodiment in that an area selection unit 58 judges whether distortion is equal to a certain threshold or smaller to automatically select the area and correct the detection image data as shown in FIG. 11. The method according to the second embodiment is now discussed in more detail.

As illustrated in FIG. 10, the projector 50 includes a light source control circuit 51 constituting a projection control circuit, an image processing circuit 52, the CCD camera 4, and the image processor 53.

According to the projector 50 having this structure, frequency of RGB signals inputted through an image input pin 54 such as USB is converted by a converter 55, for example. The converted RGB signals are accumulated in a frame buffer 56 as image signals by frames, and outputted to an image corrector 57. The image corrector 57 performs gradation correction, luminance unevenness correction, color unevenness correction, and other correction according to the liquid crystal panel 32 to control drive of the liquid crystal panel 32.

The CCD camera 4 has the CCD 42 and the image capturing processing circuit 41 similarly to the first embodiment. A sensing image processed by the image capturing processing circuit 41 is outputted to the image processor 53.

The image processor 53 has the detection image data production unit 11, the detection image display unit 12, the image comparing unit 13, the area selection unit 58, the detection image data correction unit 15, and the image signal correction unit 16 similarly to the first embodiment.

The area selection unit 58 is different from the area selection unit 14 in the first embodiment in that the area selection unit 58 automatically selects an area containing distortion larger than a predetermined threshold based on the distortion and relative distortion calculated by the image comparing unit 13. Then, the detection image data correction unit 15 increases the positioning density of the marker images in the selected area. Whether the distortion is smaller than the threshold is judged based on the judgment whether the distortion between the coordinates (X'n, Y'n) converted by the projective transformation matrix A in the equation (1) in the first embodiment and the coordinates (Xn, Yn) in the captured data satisfies the following equation (2):

$$(\text{threshold}) > (Xn-X'n)^2 + (Yn-Y'n)^2 \quad (2)$$

When the distortion correction method for images projected by the projector is performed by using the image processor 53, the detection image data production unit 11 initially produces detection image data (step S1), and writes the produced detection image data to the frame buffer 56 as shown in FIG. 11. Then, the detection image display unit 12 displays a detection image on the screen SC based on the detection image data written to the frame buffer 56 (step S2).

Then, the CCD camera 4 captures an image of the projected detection image, and outputs captured data to the image processor 53 (step S3).

The image comparing unit 13 sets the coordinate positions of marker images based on the received captured data (step S12), and calculates distortion and relative distortion of the marker images similarly to the first embodiment (step S13).

The area selection unit 58 judges whether distortion correction is necessary based on the calculated distortion, relative distortion and the thresholds set for them, respectively (step S15). When it is judged that distortion correction is unnecessary, the process ends.

When it is judged that distortion correction is necessary, the area selection unit 58 judges whether distortion and relative distortion are smaller than the predetermined threshold (step S16), and corrects the detection image data for the area having distortion and relative distortion equal to or larger than the threshold (step S17).

When the area selection unit 58 determines that distortion and relative distortion in all areas are smaller than the threshold after repeating the above steps, the image signal is corrected to finish the process similarly to the first embodiment (step S14).

According to this embodiment, the area having large distortion can be automatically selected by the area selection unit 58 based on the distortion and relative distortion calculated by the image comparing unit 13 in addition to the advantages provided in the first embodiment. Thus, correction of the detection image data can be automatically performed, and distortion correction for the projection image can be achieved without requiring operation by the observer.

Moreover, the distortion correction method for the projection image is performed within the image processor 53 included in the projector 50. Thus, distortion correction for the projection image can be automatically executed by the single body of the projector 50.

Modified Example

The invention is not limited to the embodiments described herein, but may be practiced otherwise as in the following modified examples.

Figure 12:
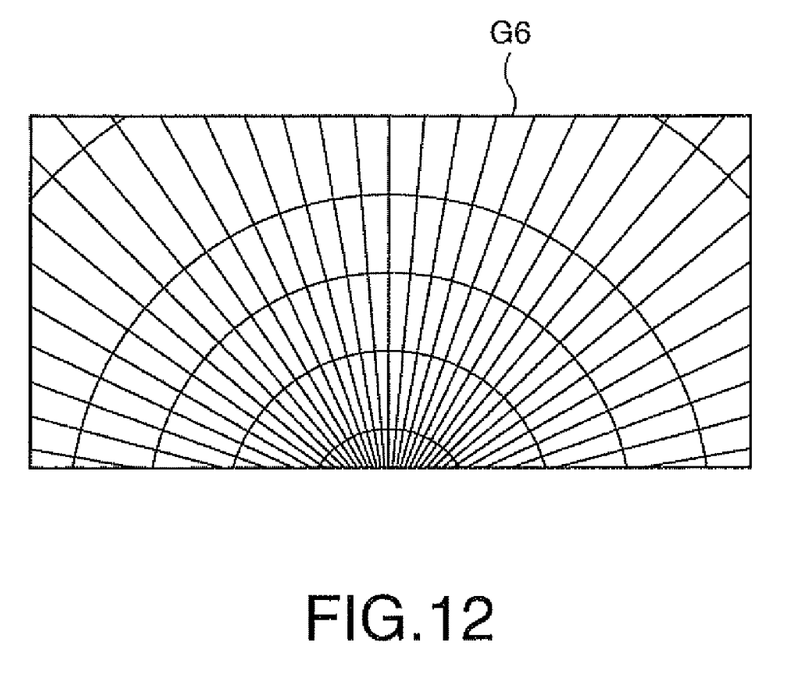
FIG. 12 schematically illustrates a structure of detection image data according to a modified example of the invention.

According to the first embodiment, the detection image data G1 contains the white marker images p1, p2, p3 and others discretely arranged on the black screen. However, a detection image data G6 having radial grating pattern shown in FIG. 12 may be employed. In the detection image data G6, the coordinate positions need to be specified only at grating points. Moreover, distortion correction for the projection image considering upward projection of the projector can be performed by radially expanding the grating pattern from approximately the center of the lower end of the image data.

While the projector 3 having the liquid crystal panel 32 executes the distortion correction method for the projection image of the projector according to the invention in the first embodiment, a projector including a device using micromirror may be employed for performing the distortion correction method.

Other structure or the like may be included in place of the specific components and processes discussed herein as long as the advantages of the invention can be provided.

The entire disclosure of Japanese Patent Application No. 2008-083394, filed Mar. 27, 2008 is expressly incorporated by reference herein.

What is claimed is:

1. A method for correcting distortion of an image projected by a projector, comprising:
    a first detection image data producing step which produces first detection image data containing marker images whose flat surface positions in the projection image can be calculated;
    a first detection image displaying step which displays a first detection image based on the first detection image data;
    a first image comparing step which compares the first detection image with the first detection image data;
    an area selecting step which selects an area having larger distortion of the first detection image than distortion in other area based on the comparison;
    a second detection image data producing step which increases positioning density of the marker images in the selected area to produce second detection image data;

a second detection image displaying step which displays a second detection image based on the second detection image data;

a second image comparing step which compares the second detection image with the second detection image data; and an image correcting step which corrects the projection image.

2. The method for correcting distortion of an image projected by a projector according to claim 1, wherein:

the first detection image data is image data containing a plurality of marker images discretely arranged on a flat surface;

the first image comparing step captures an image of the first detection image using an image capturing unit, and calculates distortion between the first detection image data and captured data of the first detection image using statistical method;

the second image comparing step captures an image of the second detection image using the image capturing unit, and calculates distortion between the second detection image data and captured data of the second detection image using statistical method; and the area selecting step selects an area having distortion equal to or larger than a predetermined threshold.

3. The method for correcting distortion of an image projected by a projector according to claim 2, wherein the statistical method employed in the first image comparing step and the second image comparing step is least squares method.

4. The method for correcting distortion of an image projected by a projector according to claim 2, wherein:

a relative distortion calculating step which calculates relative distortion between adjoining marker images is performed between the first image comparing step and the area selecting step; and the area selecting step selects an area having relative distortion calculated by the relative distortion calculating step equal to or larger than the predetermined threshold.

5. A projector which forms a projection image, comprising:

a first detection image data producing unit which produces first detection image data containing marker images whose flat surface positions in the projection image can be calculated;

a second detection image data producing unit which increases positioning density of the marker images in selected area to produce second image data;

a detection image displaying unit which displays a first detection image based on the first detection image data, and displays a second detection image based on the second detection image data;

an image capturing unit which captures an image of the displayed first detection image, and captures an image of the displayed second detection image;

an image comparing unit which calculates first distortion between captured data of the first detection image captured by the image capturing unit and the first detection image data, and calculates second distortion between captured data of the second detection image captured by the image capturing unit and the second detection image data;

an area selecting unit which selects an area having the calculated distortion equal to or larger than the predetermined threshold; and an image signal correcting unit which corrects the inputted image signal based on the correction result of the second detection image data correcting unit.

* * * * *